United States Patent

Sakamoto et al.

[11] Patent Number: 5,885,162
[45] Date of Patent: Mar. 23, 1999

[54] UNIVERSAL JOINT

[75] Inventors: Masao Sakamoto; Mitsumasa Iijima, both of Kanagawa, Japan

[73] Assignee: Unisia Jecs Corporation, Atsugi, Japan

[21] Appl. No.: 811,734

[22] Filed: Mar. 6, 1997

[30] Foreign Application Priority Data

Mar. 8, 1996 [JP] Japan ................................ 8-051940

[51] Int. Cl.⁶ .................................................. F16D 3/224
[52] U.S. Cl. .......................................... 464/145; 464/906
[58] Field of Search .................................. 464/143, 145, 464/906; 403/270, 271

[56] References Cited

U.S. PATENT DOCUMENTS

| | | | |
|---|---|---|---|
| 4,094,376 | 6/1978 | Welschof | 464/145 X |
| 4,784,441 | 11/1988 | Welschof et al. | 464/906 X |
| 4,835,829 | 6/1989 | Welschof et al. | 464/906 X |
| 5,230,660 | 7/1993 | Warnke | 464/906 X |
| 5,549,514 | 8/1996 | Welschof | 464/145 |
| 5,580,313 | 12/1996 | Jacob et al. | 464/145 |
| 5,618,235 | 4/1997 | Krude et al. | 464/906 X |

FOREIGN PATENT DOCUMENTS 55-175627  6/1954  Japan .

*Primary Examiner*—Eileen Dunn Lillis
*Attorney, Agent, or Firm*—Foley & Lardner

[57] ABSTRACT

A universal joint constituted by a first joint, a second joint and a rolling element. The first joint is formed by friction-welding an outer race member and a connecting shaft member. The connecting shaft member has a ring-shaped connecting portion which is welded with a bottom portion of the outer race member. The connecting portion is formed to project from a recess portion of the connecting shaft member toward the outer race member. Therefore, burr generated by the friction welding between the connecting portion and the bottom surface of the outer race member is received in a space defined by the recess portion and the bottom surface of the outer race member. This facilitates removal of the burr.

7 Claims, 4 Drawing Sheets

UNIVERSAL JOINT

BACKGROUND OF THE INVENTION

The present invention relates to a universal joint for transferring motive force between a drive shaft and a driven shaft in equal speed.

Various universal joints for equivalently transferring drive power from a drive shaft to a driven shaft have been proposed and in practical use. A typical universal joint is constituted by a first joint, a second joint and a rolling element. The first joint includes a connecting shaft member connected to an output shaft of a reduction gear and an outer race member connected to the connecting shaft member. The second joint includes a transfer shaft interconnected with driven wheels and an inner race member connected to the transfer shaft and engaged with the outer race member through the rolling element. A popular production method of the first joint is disclosed in a Japanese Utility Model Provisional Publication No. 55-175627 in which a ring-shaped projection formed on an end surface of an outer race member is welded with a ring-shaped connecting portion of a connecting shaft member by means of friction welding. The welded portion is covered with a dust seal member to facilitate the removal of burr generated by the friction welding.

However, this joint obtained by the friction welding of two projections is required to further improve the productivity and the material efficiency without complicating the structure of the connecting shaft member.

SUMMARY OF THE INVENTION

It is an object of the present invention to provide an improved universal joint which facilitates removal of burr generated by the friction welding and simplifies a die-structure so as to decrease machining time and to improve material efficiency.

A universal joint according to the present invention comprises an inner race member and an outer race member interconnected with the inner race member through a rolling member. A connecting shaft member is formed to have a recess portion at a surface facing a connecting surface portion of the outer race member and a connecting portion formed at the recess portion. The connecting portion of the connecting shaft member is connected with the connecting surface portion of the outer race member by means of friction welding.

DETAILED DESCRIPTION OF THE INVENTION

Figure 1:
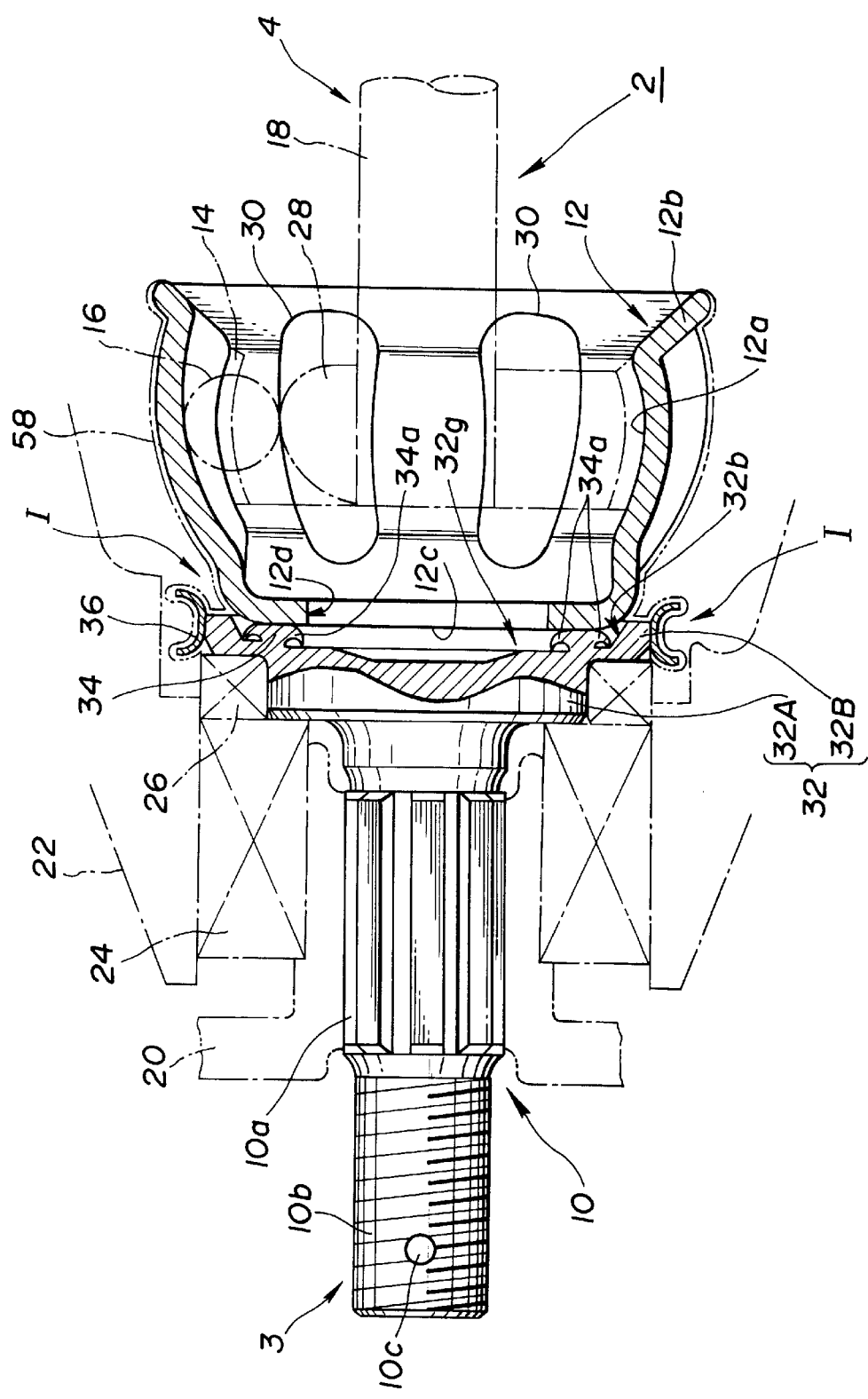
FIG. 1 is a side view which shows an essential part of a universal joint of a first embodiment according to the present invention.
Figure 2:
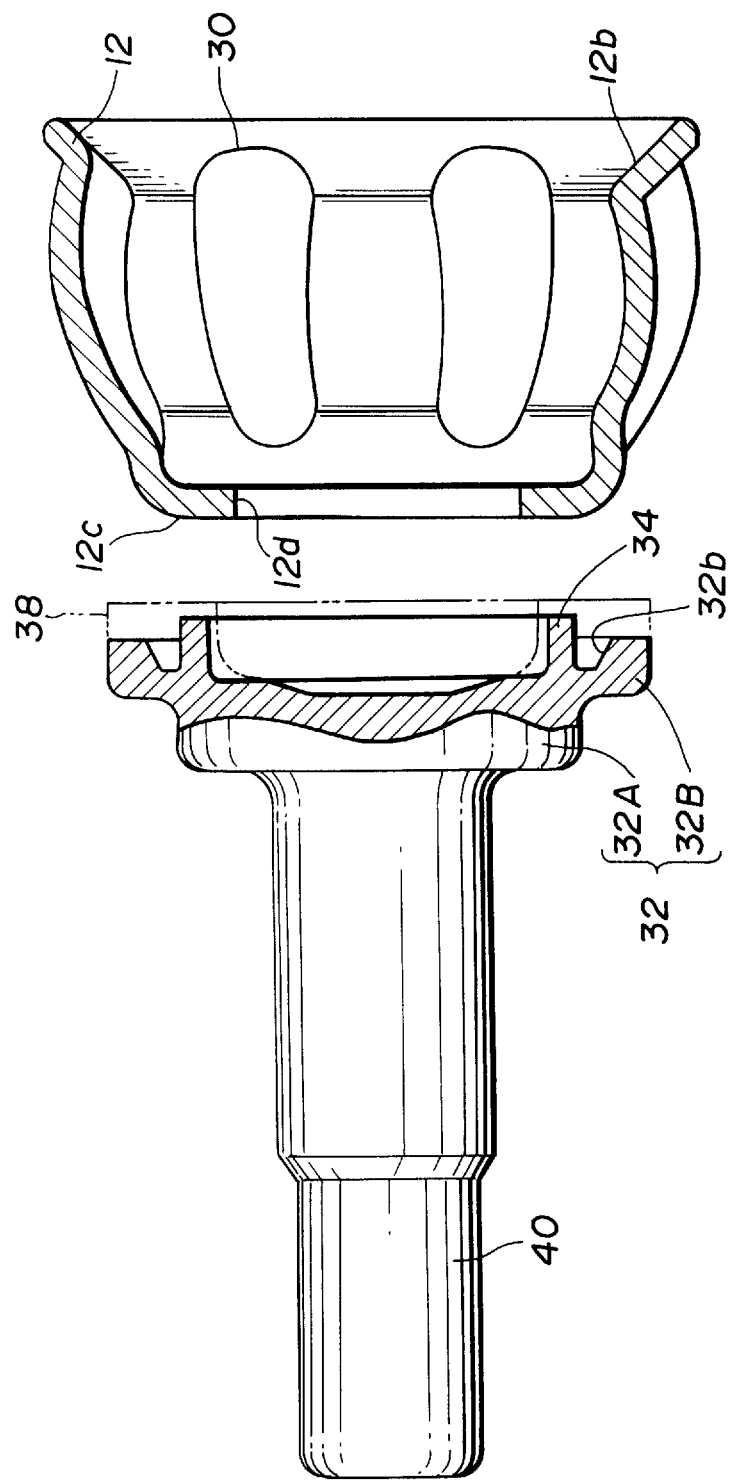
FIG. 2 is a side view, partly in cross-section, of the essential part of FIG. 1 showing parts which are yet separated.
Figure 3:
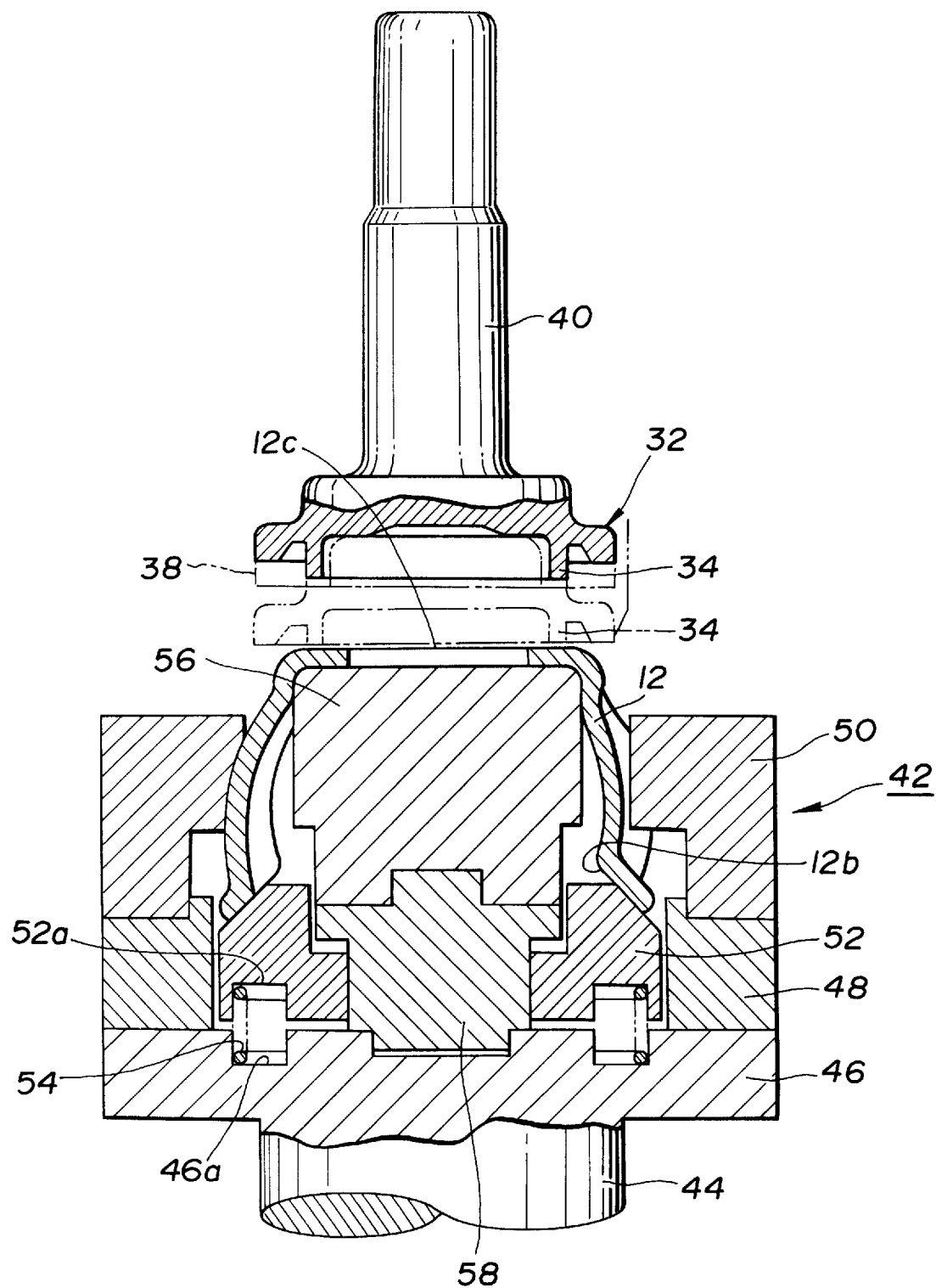
FIG. 3 is a cross sectional view which shows an essential part of a friction welding apparatus applied to the assembly of the universal joint of FIG. 1.

Referring to FIGS. 1 to 3, there is shown a first embodiment of a universal joint 2 according to the present invention.

As shown in FIG. 1, the universal joint 2 comprises a first joint 3, a second joint 4 and six balls 16. The first joint 3 is constituted by a connecting shaft member 10 whose one end portion is coupled with a wheel support portion 20 of a vehicle body (not shown) and an outer race member 12 fixed to the other end portion of the connecting shaft member 10. The second joint 4 is constituted by an inner race member 28 which is swingably disposed inside of the outer race member 12 through a cage member 14 and a connecting shaft 18 whose one end portion is fixed to the inner race member 28 and whose other end portion is connected to a transfer shaft (not shown). An inner periphery of the outer race member 12 is formed into a spherical surface and has six raceway grooves 30 which are formed at equal intervals thereon. An outer periphery of the inner race member 28 is formed into a spherical surface and has six grooves (no numeral) corresponding to the six raceway grooves 30 of the outer race member 12. The six balls 16 are disposed in the spaces defined by the six raceway grooves 30 of the outer race member 12 and the six grooves of the inner race member 28 so as to function as rolling elements.

The outer race member 12 is produced by press forming, for example, a hot-rolled sheet steel (for example, SAPH440 represented by JIS mark) into a cup shape. The outer race member 12 has a spherical inner surface portion 12a with which the outer surface of the cage member 14 is slidably in contact, a taper surface portion 12b which is formed at an opening end of the outer race member 12 and continuous to the inner surface portion 12a, a flat connecting surface portion 12c at which the outer race member 12 is connected to the connecting shaft 10 and a through hole 12d formed at a flat connecting surface portion 12c of the outer race member 12 to lighten the outer race member 12.

The connecting shaft member 10 is made from carbon steel, such as S53C represented by JIS mark, by means of forging. An end portion of the connecting shaft member 10 has a spline shaft portion 10a and a screw portion 10b. The spline shaft portion 10a is engaged with spline teeth formed at an inside surface of a wheel supporting member 20 which is rotatably supported to an inner surface of a knuckle arm member 22 of the vehicle body through a cone roller bearing 24. The screw portion 10b is screwed with a fixing nut for fixing the connecting shaft member 10 with the wheel supporting portion 20. A through hole 10c for inserting a snap pin or locking pin (not shown) is formed at a generally center portion of the screw portion 10b. Further, the other end portion of the spline shaft member 10a is connected to a connecting member 32 which is integrally formed with the connecting shaft member 10.

The connecting member 32 is constituted by a small-diameter portion 32A whose one end is integral with the spline shaft portion 10a and a large-diameter portion 32B which has a connecting portion 34. The connecting portion 34 of the large-diameter portion 32B is formed into a ring-shaped projection which projects from a bottom portion of a recess portion 32g toward the connecting surface portion 12c of the outer race member 12 so as to be friction-welded with the connecting surface portion 12c of the outer race member 12. An oblique surface portion 32b is formed outside of the connecting portion 34 in the radial direction in the recess portion 32g. An oblique portion 32b defined by the recess portion 32g receives the burr 34a generated by the friction-welding between the connecting portion 34 and the connecting surface portion 12c.

Press-fitted on the outer periphery of the large-diameter potion 32B is a ring-shaped dust seal member 36 which is made of sheet steel and formed into a U-shape in cross-section. The dust seal member 36 is placed so as to have a predetermined clearance between its outer peripheral portion and an inner peripheral portion of the knuckle arm member 22. This arrangement suppresses the entrance of mud and the like from a position indicated by arrow I of FIG. 1 to the cone roller bearing 24 when the outer race member 12 and the dust seal member 36 are rotated. Further, a seal member 26 is disposed between the outer peripheral portion of the small-diameter portion 32A-and an inner peripheral portion of the knuckle arm member 22.

To accomplish of the friction welding between the connecting shaft member 10 and the outer race member 12, the outer race member 12 produced by means of press forming and a blank member 38 for the connecting shaft member 10, which is shown by a two dots and dash line of FIG. 2, formed by means of forging are provied. Then, the blank member 38 is formed into a basic member 40 of the connecting shaft member 10 by machining the surface which is to be connected to the connecting surface of the outer race member 12. This connecting shaft basic member 40 has the small-diameter portion 32A and the large-diameter portion 32B which includes the connecting portion 34 projecting from the recess portion 32g and the oblique surface portion 32b.

Next, the machined connecting shaft basic member 40 and the outer race member 12 are set to a friction welding machine 42, as shown in FIG. 3. This friction welding machine 42 is mainly comprised of a pressing jig 50, which supports the outer peripheral surface of the outer race member 12; a work receiving base 56, which supports the inner peripheral surface opposite the connecting surface 12c of the outer race member 12; and a center adjusting member 52, which supports a taper surface portion 12b of the outer race member 12. The pressing jig 50 is selectedly connected to a ring shaped supporting member 48 which is fixed on a base 46 connected to a rotation shaft 44. The work receiving base 56 is engaged with an end portion of a guide member 58 whose other end portion is fixedly connected to the base 46 such that a center axis of the guide member 58 corresponds with the center axis of the center adjusting member 52. The center adjusting member 52 is supported to the guide member 58 so as to be vertically movable. These elements of the friction welding machine 42 are made of structural carbon steel except for the work receiving base 56. The center adjusting member 52 and the base 46, each have spring receiving portions 52a and 46a, respectively which are oppositely formed so as to install a coil spring 54 for biasing the center adjusting member 52 upward therein.

The pressing jig 50 is arranged so as to be released from the supporting member 48 by means of a moving mechanism (not shown) when the outer race member 12 is installed to or detached from the work receiving base 56. The work receiving base 56 is made of a tungsten base copper-tungsten alloy so as to exhibit small thermal expansion and high-durability at high temperatures. Therefore, the work receiving base 56 endures frictional pressure, frictional heat, and braking impact force applied to the receiving surface of the work receiving base 56 so as to avoid the breakage of the receiving surface. With this application, it is unnecessary to frequently adjust the feed ratio of the rotation shaft 44 in the axial direction to account for thermal expansion.

With this friction welding machine 42, the friction welding operation is executed as follows.

First, while the pressing jig 50 is released from the supported member 48, the outer race member 12 is put on the work receiving base 56 so that the inner surface of the outer race member 12 is in contact with the receiving surface of the work receiving base 56. The taper surface portion 12b of the outer race member 12 is received by the center adjusting member 52 so that the center axis of the outer race member 12 corresponds with the center axis of the rotation shaft 44.

Next, the pressing jig 50 is moved down until it is in contact with the supporting member 48. This restricts the movement of the outer race member 12 and moves the center shaft adjusting member 52 downward against the biasing force of the coil spring 54.

Following this, the connecting shaft basic member 40, which is to be connected to the connecting surface portion 12c of the outer race member 12, is moved from a position shown by a continuous line to a position shown by a two-dots and dash line as shown in FIG. 3.

Then, the rotation shaft 44 is rotated at the predetermined rotation speed and is pushed toward the connecting shaft basic member 40, which is fixed at the position shown by the two-dots and dash line as shown in FIG. 3. In order to avoid a corner portion of the outer race member 12 from being connected with the oblique surface portion 32b of the connecting shaft basic member 40 by means of the friction welding, they are shaped such that there exists a predetermined clearance therebetween.

By the above-mentioned welding operation, the connecting portion 34 of the connecting shaft basic member 40 and the connecting surface 12c of the outer race member 12 are welded with pressure by means of frictional heat generated therebetween, and therefore the connecting shaft basic member 40 and the outer race member 12 are fixedly connected.

The connected member, including the outer race member 12 and the connecting shaft basic member 40, is machined to form the spline teeth 10a, screw portion 10b and the through hole 10c to the connecting shaft basic member 40. Then, the dust seal member 36 is press-fitted with the outer peripheral portion of the large-diameter portion 32B. Thus, the first joint 3 shown in FIG. 1 is produced. As shown by the two-dots and dash line of FIG. 1, a covering layer 58 is formed on the outer race member 12 and the connecting member 32 by coating paint which includes rust preventatives, the outer periphery of the first joint 3. The clearance between the oblique portion 32b and the corner portion of the outer race member 12 is covered with the covering layer 58 so suppress the generation of rust thereto.

With the thrus constructed universal joint, the burr 34a generated at the connecting portion by the friction welding is kept in the recess portion 32g and the flat connecting surface 12c of the outer race member 12 is located within the recess portion 32g. Therefore, the total length of the first joint 3 is shortened. Further, it becomes possible to facilitate removal of the burr 34a generated by the friction welding and to simplify die-structure. These enable the decrease of machining time and the improvement of material efficiency.

Figure 4:
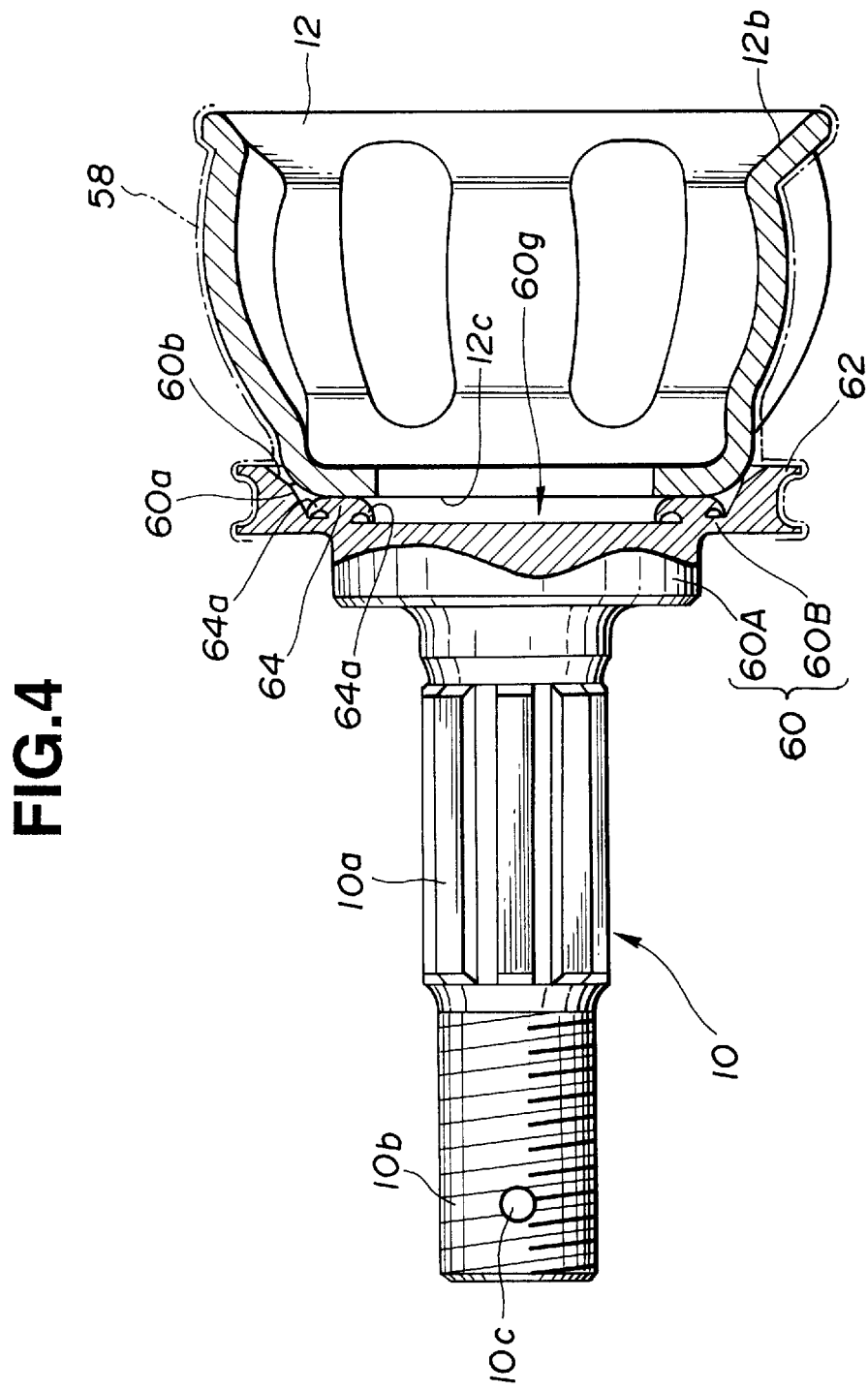
FIG. 4 is a side view which shows an essential part of the universal joint of a second embodiment according to the present invention.

Referring to FIG. 4, there is shown a second embodiment of the universal joint according to the present invention. The second embodiment is generally the same as the first embodiment except that a dust seal portion 62 is integrally formed with a large diameter portion 60B of a connecting member 60. The other parts and structures what are the same as those of the first embodiment are designated by the same numerals of the first embodiment and the explanation thereof is omitted herein.

The connecting member 60 is comprised of a small-diameter portion 60A whose end portion is connected to the spline shaft portion 10a and the large-diameter portion 60B which includes a connecting portion 64, which is welded with the connecting surface portion 12c of the outer race member 12 by means of friction welding. The connecting portion 64 of the large-diameter portion 60B is formed into a ring-shaped projection, which projects from a bottom portion of a recess portion 60g toward the connecting surface portion 12c of the outer race member 12. First and second oblique surface portions 60a and 60b are formed outside of the connecting portion 64 in the radial direction of the recess portion 60g. A space defined by the recess portion 60g receives burr 64a, which is generated by the friction-welding between the connecting portion 64 and the connecting surface portion 12c.

Integrally formed on the outer periphery of the large-diameter potion 60B is a ring-shaped dust seal member 62 which is made of sheet steel and formed into a U-shape in cross-section. The dust seal member 62 is placed so as to have a predetermined clearance between its outer peripheral portion and an inner peripheral portion of the knuckle arm member 22. As shown by a dot and dash line of FIG. 4, a covering layer 58 is formed on the outer race member 12 and the connecting member 60 by paint which includes rust preventatives, the outer periphery of the first joint 3.

Accordingly, with the arranged second embodiment, the advantages obtained by the first embodiment are similarly obtained, and further the second embodiment improves the productivity of the first joint 3 since the dust seal portion 63 is integrally formed with the large-diameter portion 60B.

While the invention has been particularly shown and described with reference to preferred embodiments thereof, it will be understood by those skilled in the art that the foregoing and other changes in form and details can be made therein without departing from the sprit and scope of the invention.

What is claimed is:

1. A universal joint comprising:
   an inner race member;
   a rolling member;
   an outer race member interconnected with said inner race member through said rolling member; and
   a connecting shaft member having a large diameter portion defining a recess portion at a surface facing a connecting surface portion of said outer race member, said connecting shaft member having a connecting projection within the large diameter portion and extending from portion which is formed at the recess portion, the connecting projection of said connecting shaft member being connected to the connecting surface portion of said outer race member by means of friction welding.

2. A universal joint as claimed in claim 1, wherein the connecting projection of said connecting shaft member has a ring-shaped projection projecting from a bottom portion of the recess portion toward the connecting surface of said outer race member.

3. A universal joint as claimed in claim 1, further comprising a cover member connected to an outer peripheral portion of an end portion of said connecting shaft member so as to cover the connecting projection of said outer race member and the end portion of said connecting shaft member.

4. A universal joint as claimed in claim 3, wherein said cover member is integrally formed with said connecting shaft member.

5. A universal joint as claimed in claim 1, wherein said outer race member has a general cup-shape having a flat bottom, an outer periphery of the flat bottom being the connecting surface portion of the outer race member.

6. A universal joint comprising:
   an inner race member;
   a rolling member;
   an outer race member interconnected with said inner race member through said rolling member; and
   a connecting shaft member having a cylindrical portion at a surface facing a connecting surface portion of said outer race member and defining a recess portion, said connecting shaft member having a connecting projection formed within the recess portion, the connecting projection of said connecting shaft member being connected to the connecting surface portion of said outer race member by means of friction welding.

7. A universal joint as claimed in claims 6, wherein a clearance is formed between an inner peripheral portion of the cylindrical portion of said connecting shaft member and an outer peripheral portion of an end portion of said outer race member.

* * * * *